United States Patent [19]

Hirose

[11] Patent Number: 4,881,455
[45] Date of Patent: Nov. 21, 1989

[54] PISTON FOR USE IN A GAS PUMP

[75] Inventor: Fuminori Hirose, Tokyo, Japan

[73] Assignee: Nitto Kohki Co., Ltd., Tokyo, Japan

[21] Appl. No.: 199,759

[22] Filed: May 27, 1988

[30] Foreign Application Priority Data

May 30, 1987 [JP]  Japan .............................. 62-84780[U]

[51] Int. Cl.$^4$ .............................................. F16J 9/00
[52] U.S. Cl. ........................................ 92/248; 92/258;
            92/172; 277/216; 277/221
[58] Field of Search ................. 92/192, 195, 198, 200,
      92/214, 223, 232, 234, 258, 235, 236, 237, 240,
      259, 248; 91/357, 402; 277/216, 218, 219, 220,
      221

[56] References Cited

U.S. PATENT DOCUMENTS

| | | | |
|---|---|---|---|
| 603,376 | 5/1898 | Field et al. | 277/221 |
| 1,179,283 | 4/1916 | Cooper | 277/221 |
| 1,390,577 | 9/1921 | Nagy | 277/221 |
| 2,464,653 | 3/1949 | Phipps | 277/221 |
| 2,759,777 | 8/1956 | Anderson | 277/221 |
| 3,655,208 | 4/1972 | Walker | 277/221 |
| 4,189,161 | 2/1980 | Grimm | 277/221 |
| 4,719,938 | 1/1988 | Pandorf | 92/200 |

FOREIGN PATENT DOCUMENTS

| | | | |
|---|---|---|---|
| 0248101 | 4/1926 | Italy | 277/221 |
| 0027811 | of 1903 | United Kingdom | 277/221 |
| 0004634 | of 1906 | United Kingdom | 277/221 |

OTHER PUBLICATIONS

*Journal of Teflon* pp. 6–7 Tests try "Teflon" for Diesel Engine Piston Rings, Sugimoto Copyright 6/1966.

Primary Examiner—Robert E. Garrett
Assistant Examiner—Thomas Denion
Attorney, Agent, or Firm—Nixon & Vanderhye

[57] ABSTRACT

A piston slidably inserted in the cylinder of a gas pump, said cylinder having a cylinder head and an outlet valve located near the cylinder head. The piston comprises a cylindrical piston body and a wear-reducing sheet wound one time around the piston body. The opposing edges of the wear-reducing sheet are cut stepwise, such that at least two gaps are formed between the edges, which are set apart from each other for a predetermined distance in the circumferential direction of the piston body, and such that no gap portion is formed between the edges, which connects the two gaps and extends substantially in the circumferential direction of the piston body.

1 Claim, 2 Drawing Sheets

PISTON FOR USE IN A GAS PUMP

BACKGROUND OF THE INVENTION

1. Field of the Invention

The present invention relates to a piston for use in a gas pump, to be slidably inserted in a cylinder which has a head and an outlet valve located close to the head. In particular, the invention relates to an improvement of the butting edges of the wear-reducing sheet wound one time around the periphery of the piston.

2. Description of the Related Art

FIG. 1 shows a typical piston for use in a gas pump. This free piston is rotatably and slidably inserted in a cylinder. When the poston moves toward the upper dead point, or moves leftward in FIG. 1, the compressed gas pushes open the outlet valve located in the vicinity of the head of the cylinder, and is thus exhausted from the cylinder through the outlet valve. As the piston further approaches the upper dead point, it closes the outlet valve. Once the outlet valve has been thus closed, the residual gas is further compressed within the pressure chamber defined by the top of the piston and the inner surfaces of the cylinder head. When the piston reaches the upper dead point, the compressed gas functions as a cushion, preventing the piston from abutting against the inner surface of the cylinder head.

When such a free piston is incorporated in a gas pump or a compressor, a wear-reducing sheet, which is resistant to friction and heat, is wrapped around the periphery of the piston, thereby to reduce the wear of the piston. The wear-reducing sheet must be wound around the piston such that its curvature is exactly the same as that of the periphery of the piston and the inner periphery of the cylinder. Even a slightest difference in curvature between the sheet and the inner periphery of the cylinder cannot be overlooked. Hence, the sheet must be wound around the piston, with both edges abutting on each other, not overlapping each other.

During the operation of the pump or compressor, the free piston reciprocates within the cylinder it is possible that the wear-reducing sheet undergoes a volume thermal expansion due to the heat resulting from the friction between the sheet and the inner periphery of the cylinder. To prevent the sheet from deforming because of such a volume thermal expansion, it is necessary to wrap the sheet around the piston, with a narrow gap left between the edges of the wear-reducing sheet. This causes a problem however. When the piston rotates within the cylinder such that this gap comes into alignment with the port of the outlet valve, the compressed gas in the pressure chamber flows out, first though the gap and then through the outlet valve. Consequently, the cushioning effect of the compressed gas is inevitably reduced.

It is true that the wear-reducing sheet protects the free piston from wear and heat. Nonetheless, it can cause a leak of gas unless it is appropriately wound around the free piston. If the gas leaks through the gap between the edges of the sheet, it generates a buzzing sound as it passes through the outlet valve.

SUMMARY OF THE INVENTION

It is accordingly the object of the present invention to provide a piston for use in a gas pump, which is wound with a wear-reducing sheet which causes no leak of the gas from the chamber of the cylinder. This object is attained by a piston according to the invention. The piston is slidably inserted in a cylinder. It comprises a cylindrical piston body having an outer periphery, and a wear-reducing sheet wound one time around the outer periphery of the piston body. The opposing edges of the sheet are cut such that at least two gaps are formed between the edges, which are set apart from each other for a predetermined distance in the circumferential direction of the piston body, and that no gap portion is formed between the edges, which connects the two gaps and extends substantially in the circumferential direction of the piston body.

Since no gap is formed between the butting edges of the sheet, which extends substantially along the circumference of the piston body or connects the two gaps between the butting edges of the sheet, the compressed gas cannot leak from the pressure chamber through either gap as the piston approaches the upper dead point. The pressure of the gas within the pressure chamber is therefore high enough to prevent the free piston from abutting against the cylinder head, thus allowing the piston to reciprocate smoothly within the cylinder. Since the compressed gas does not leak from the cylinder, the pump makes no large buzzing noises, and need not be equipped with a muffler.

DETAILED DESCRIPTION OF THE PREFERRED EMBODIMENTS

Embodiments of the present invention will now be reference to the drawings attached hereto.

Figure 1:
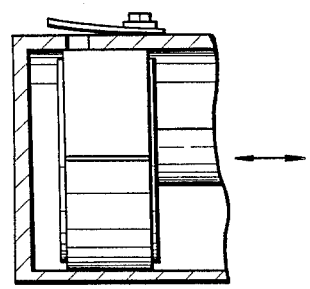
FIG. 1 is a partial sectional view of a gas pump using a conventional piston.
Figure 2:
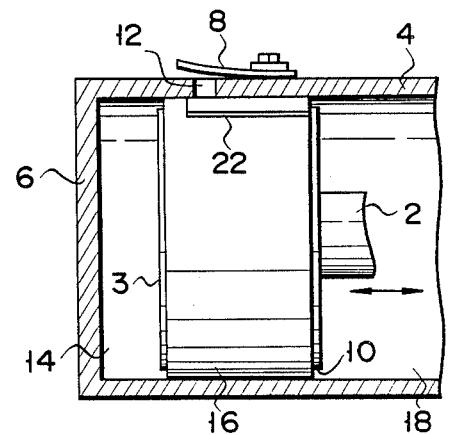
FIGS. 2 and 3 are side views showing a piston according to a first embodiment of the present invention, which is inserted in the cylinder of a gas pump.
Figure 3:
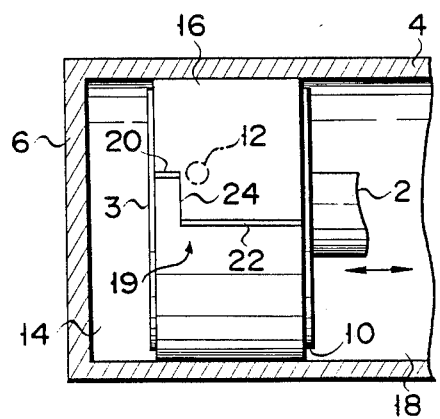

FIGS. 2 and 3 shows the cylinder of a gas pump, and a piston according to a first embodiment of the invention, which is slidably and rotably inserted in the cylinder. As piston 2 moves toward the upper dead point, or leftward (FIG. 2), the compressed gas pushes open outlet valve 8 located near head 6 of cylinder 4, and is thus exhausted from cylinder 4 through valve 8. As piston further approaches the upper dead point thereafter, the outer periphery 10 of piston 2 closes the valve port 12 of outlet valve 8.

After the compressed gas has been exhausted from cylinder 4 through valve port 12, and valve port 12 has been closed by piston 2, pressure chamber 14 is formed between the inner surface of cylinder head 6 and the forward end of piston 2. The gas remaining in pressure chamber 14 is compressed as piston 2 approaches the upper dead point. Eventually, the pressure of the gas rises high enough to cushion piston 2, thus preventing piston 2 from abutting against cylinder head 6.

The structure of the piston according to the first embodiment will be explained in detail. As is shown in FIGS. 2 and 3, piston 2 comprises cylindrical piston body 3 and wear-reducing sheet 16 wound one time around the outer periphery 10 of piston body 3. Wear-reducing sheet 16 is made of a fluorine resin which excells in heat-resistance and wear-resistance. As is shown in FIG. 3, the opposing edges of wear-reducing sheet 16 are cut stepwise. Sheet 16 must be wound around piston 2 such that its curvature is exactly the same as that of outer periphery 10 of piston body 3 and the inner periphery of cylinder 4, not to allow a slightest difference in curvature between the inner periphery and sheet 16. Therefore, the edges 19 of sheet 16 cannot overlap one another. Sheet 16 is, thus, a little shorter than the circumference of piston body 3, and two narrow gaps are formed between the opposing edges of sheet 16 when sheet 16 is wrapped around periphery 10 of piston body 3. These gaps extend parallel to the axis of piston 2. First gap 20 is located at the forward end of piston body 3, and second gap 22 extends from the rear end of piston body 3 and spaced apart for a predetermined distance from first gap 20 in the circumferential direction of piston body 3. Those portions 24 of edges 19 of sheet 16, which extend in the circumferential direction of piston body 3, abut on each other. Hence, the gas being compressed in pressure chamber 14 as piston approaches the upper dead point cannot leak through first and second gaps 20, 22 into open chamber 18 at the rear of piston 2.

In the first embodiment of this invention, first gap 20 is sufficiently short, such that this gap is positioned well past port 12 of outlet valve 8 when piston 2 has moved close to the upper dead point. Therefore, even if the compressed gas flows into first gap 20 as piston 2 further approaches the upper dead point, the gas is blocked at the butting portions 24 of sheet edges 19. Thus, the compressed gas never pushes outlet valve 8 open, or leaks out therethrough. Hence, the gas pump makes no buzzing sound during operation.

A piston for use in a gas pump, according to a second embodiment of the invention, will now be described with reference to FIG. 4. The opposing edges of wear-reducing sheet 16 are cut in a little more complex fashion than in the first embodiment described above.

Figure 4:
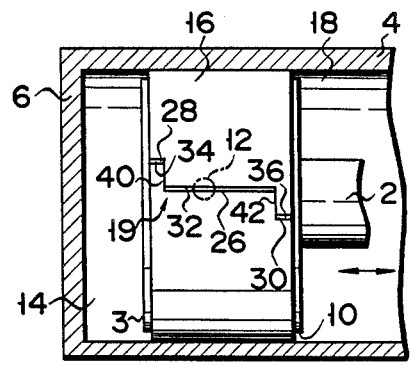
FIG. 4 is a side view showing a piston according to a second embodiment of the invention, which is inserted in the cylinder of a gas pump.

As is illustrated in FIG. 4. the edges 19 of sheet 16 wrapped around outer periphery 10 of piston body 3 have center parallel portions 26, first parallel portions 28, and second parallel portions 30. Gap 32 is formed between center portions 26; gap 34 is formed between first portions 28; and gap 36 is formed between second portions 30. All gaps 32, 34, and 36 extend parallel to the axis of piston 2. Center portions 26 are longer than first portions 28 and second portions 30, so that gap 34 is positioned well past valve hole 12 when piston 2 has moved close to the upper dead point. Thereafter, piston 2 stops, with gap 32 aligned with valve port 12. That is, gap 32 is made so long that gap 34 between first parallel portions 28 is not aligned with valve port 12 when piston 2 stops. Those portions 40 of edges 19, which extend in the circumferential direction of piston body 3, abut on each other. Similarly, those portions 42 of edges 19, which extend in the circumferential direction of piston body 3, abut on each other. In other words, the opposing edges 19 of sheet 16 are cut stepwise, each having two stepped portions, and wear-reducing sheet 16 is wound around piston body 3 such that three gaps 32, 34, and 36 are formed between edges 19, which are parallel to the axis of piston 2 and spaced apart from one another in the circumferential direction of piston body 3, and that edges 19 abut on each other at portions 40 and 42 which extend in the circumferential direction of piston body 3. Gap 32 is closed at one end by abutting portions 40, and at the other end by abutting portions 42.

In the second embodiment, even if piston 3 rotates to have gap 32 aligned with valve port 12 when piston 2 has moved close to the upper dead point, the compressed gas flowing into gap 34 from pressure chamber 14 is blocked by abutting portions 40, and does not flow into gap 32. Hence, no gas leaks through valve port 12, and the gas pump makes no buzzing sound.

Figure 5:
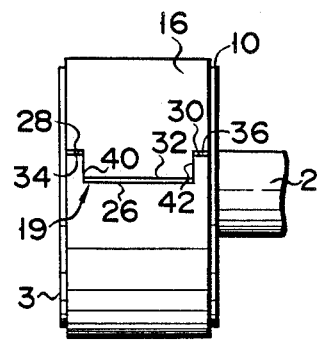
FIG. 5 is a side view of a modification of the second embodiment of the present invention.

FIG. 5 shows a modification of the second embodiment shown in FIG. 4. As is evident from FIG. 5, this modification differs from the second embodiment in that the opposing edges 19 of sheet 16 are cut such that gaps 34 and 36 are substantially aligned in the axial direction of piston body 3.

In the first and second embodiments, gaps 20 and 22, and gaps 32, 34, and 36 are substantially parallel to the axis of piston body 3. Instead, these gaps can be inclined to the axis of piston body 3. Further, the abutting portions 24 of edges 19, and the abutting portions 40 and abutting portions 42 of edges 19 can be inclined to the circumferential direction of piston body 3.

What is claimed is:
1. A piston for use in a gas pump, which is to be slidably inserted in a cylinder having a blocked cylinder head, and a valve hole and an outlet valve located on an outside surface thereof near the cylinder head, said outlet valve being opened when said piston moves in the direction of the cylinder head and approaches the cylinder head, said piston comprising:
 a cylindrical piston body having an outer periphery, a distal end portion and a central portion; and
 a wear-reducing sheet wound one time around the outer periphery of the piston body,
 said wear-reducing sheet being made of a fluorine resin having a small coefficient of friction and a high resistance to heat, and sized to surround substantially the entire outer periphery of said cylindrical piston body, said wear-reducing sheet having a pair of opposing edges;
 each of the edges of said wear-reducing sheet being provided with at least one crank-shaped portion, at least two gaps set apart from each other by a predetermined distance in the circumferential direction of the piston body, and at least one no-gap portion being formed between the edges, the no-gap portion extending substantially in the circumferential direction of the piston body to connect the two gaps; and
 the first gap located at the distal end portion of the piston body being longer than the second gap located in the central portion thereof in the axial direction of the piston body,
 whereby the no-gap portion passes the valve hole and the valve hole is located in the central portion of the piston body when said piston moves in the direction of the cylinder head and approaches the cylinder head, so that air in a pressure chamber defined by the cylinder head and piston head is prevented from leaking by the no-gap portion.

* * * * *